United States Patent

[11] 3,557,308

[72] Inventors Jack F. Alexander
Sanford;
Peter E. Mallory; Ronald C. Payne,
Maitland, Fla.

[21] Appl. No. 709,605
[22] Filed Mar. 1, 1968
[45] Patented Jan. 19, 1971
[73] Assignee General Dynamics Corporation
a corporation of Delaware

[54] DATA SYNCHRONIZING SYSTEM
13 Claims, 8 Drawing Figs.

[52] U.S. Cl. .......... 178/69.5, 328/72, 155
[51] Int. Cl. .......... H04l 7/00
[50] Field of Search .......... 178/69.5, 88; 307/269; 325/321, 325; 328/63, 72, 155; 179/15sync; 235/153, 181

[56] References Cited
UNITED STATES PATENTS

| | | | |
|---|---|---|---|
| 3,200,198 | 8/1965 | McRae | 178/69.5 |
| 3,341,658 | 9/1967 | Kaneko | 178/69.5 |
| 3,462,551 | 8/1969 | Fong | 178/69.5 |

*Primary Examiner*—Robert L. Richardson
*Attorney*—Martin Lu Kacher

ABSTRACT: A system is described for acquiring incoming serial data, particularly of PCM code types, and establishing synchronization between the incoming data and a local clock generator. The system includes input signal conditioning circuits which applies the incoming data to a phase lock loop containing the local clock generator. The phase lock loop includes circuits for acquiring the input data and synchronizing the local clock generator therewith in spite of low signal-to-noise ratios and the loss of a large percentage of the input data bits in transmission. The local clock generator circuits include circuits which compare the phase of the clock generator output with the phase of the incoming data bits on a maximum likelihood phase estimate basis. The local clock generator outputs are applied to detect the incoming bits and reconstruct them into a noise-free output data stream.

INVENTORS
JACK F. ALEXANDER
PETER E. MALLORY
RONALD C. PAYNE

BY M. Lukacher ATTY

INVENTORS
JACK F. ALEXANDER
PETER E. MALLORY
RONALD C. PAYNE
BY

BY M. Lukacher ATTY

INVENTORS
JACK F. ALEXANDER
PETER E. MALLORY
RONALD C. PAYNE

BY M. L. Kadin ATTY

INVENTORS
JACK F. ALEXANDER
PETER E. MALLORY
RONALD C. PAYNE

BY M. [signature] ATTY

INVENTORS
JACK F. ALEXANDER
PETER E. MALLORY
BY RONALD C. PAYNE

BY M. LuKacher ATTY

DATA SYNCHRONIZING SYSTEM

The present invention relates to synchronization systems and particularly systems for providing synchronization with incoming signals having a periodic structure, such for example, as serial data bits.

The invention is especially suitable for use as a ground base link in a telemetry data transmission system wherein it accepts weak, deteriorated or noisy PCM data from units such as receivers, tape recorders and the like and synchronizes on the data rate, reconstructing or regenerating the data bits in the process. Aspects of the invention are, however, generally useful in phase detection and synchronization systems.

Situations exist in data transmission systems where the incoming data is deteriorated, as by presence of noise or where the transitions between the data bits may be absent. It is necessary therefore, in order to derive useful information from the data input, to determine the presence of each bit on a statistical or maximum likelihood basis. It has been found in accordance with the invention that a maximum likelihood phase lock loop including a controlled oscillator provides a least means square estimate of phase. The output of this oscillator provides a local clock signal synchronized with the incoming bit rate to a high degree of probability. Such synchronization exists under the conditions of low signal to noise and in spite of jitter and the loss of transitions between the bits in the incoming data stream.

It is therefore an object of the present invention to provide an improved synchronization system.

It is a further object of the present invention to provide an improved synchronization system wherein incoming data can be acquired and synchronization may be established between the incoming data and a local clock generator.

It is a still further object of the present invention to provide an improved bit synchronization system which is capable or reconstructing a synchronized data output in response to incoming data bits notwithstanding a low signal-to-noise ratio, jitter of the incoming a data or a degree of deterioration of the signal.

It is a still further object of the present invention to provide an improved signal conditioner in which input data is acquired and synchronism is established between the incoming data and the local clock generator, so that output data synchronized with the clock generator and corresponding to the incoming data to a high degree of probability can be provided.

Described in greater detail, a synchronization system embodying the invention includes a phase lock loop comprising separate channels each having a mate matched filter and a full wave rectifier. The outputs of both channels are summed and a loop compensation network response to the sum of the channel outputs controls the phase of an oscillator which inturn controls the look interval of the matched filters so that the look interval of the filters in each channel are timed displaced with respect to each other. Incoming data is applied simultaneously to both channels and the sum of the channel outputs is proportional to the phase relationship between the output of the oscillator and the incoming data. The oscillator frequency is desirably higher than the incoming bit rate. Accordingly, counting circuits may be used to reduce the oscillator frequency so as to locally generate a clock synchronized with the bit rate. This clock controls the look intervals of the matched filters as well as bit detectors and reconstruct circuits which provide the synchronous output data stream.

The invention itself, both as to its organization and method of operation, as well as additional objects and advantages thereof will become more readily apparent from a reading of the following description in connection with the accompanying drawings in which.

Figure 1:
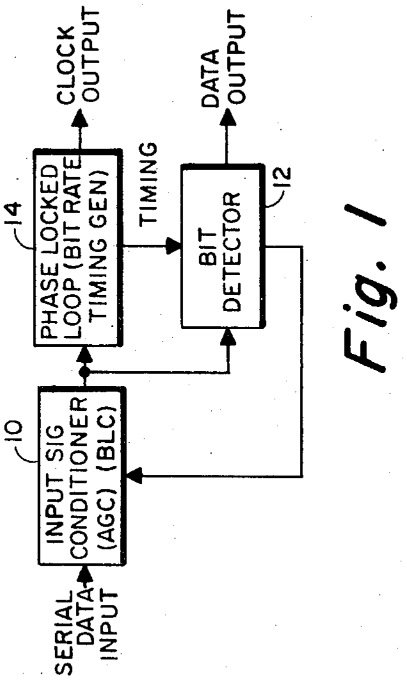
FIG. 1 is a block diagram of a synchronizing system embodying the invention.

Referring to FIG. 1 there is shown a block diagram which depicts the overall organization of the synchronization system. Serial input data is first applied to input signal conditioning circuits 10 which perform automatic gain control and automatic base line correction (viz. DC restoration). The automatic gain control circuits in the input signal conditioner includes an input amplifier and a gain control amplifier. Automatic gain control is accomplished by comparing the amplitude of the input data with a fixed amplitude the threshold in a threshold detector circuit. The output of the threshold detector, which may be a Schmidt trigger producing a pulse during each bit time, is used in increment or decrement an up-down counter according to whether the input data amplitude is above or below the threshold amplitude level. A digital-to-analogue converter translates the counts stored in the up-down counter into an analogue voltage which is used as the AGC control voltage in the input amplifier. If desired, the most significant bits of the up-down counter may be used in the control of switching devices, such as relays, in the amplifier for coarse gain control or automatic amplitude range switching while the remaining bits from the counter are converted into the analogue AGC control voltage.

Base line correction of the input data may be accomplished with the same general technique as is used for automatic gain control purposes. An integrator circuit such as an integrate and dump circuit in the bit detector 12 of the system is used to integrate the incoming data bits. The peak valve values of these bits are each compared with a threshold voltage. The threshold detector may be a Schmidt trigger which provides output pulses as the threshold is exceeded. In order to determine the direction of the offset, an exclusive OR circuit compares the output of the Schmidt trigger with the detached data bits to produce pulses in the proper direction at the inputs of the up-down counter. The binary count stored in the counter is converted by digital-to-analog connecter circuits into an analogue signal which is summed with the data at the input to an amplifier to in the signal conditioner circuits 10 in order to restore the base line of the serial data input to the proper level.

The signal output from the input conditioner 10 is then applied to the phase lock loop 14 and the bit detectors 12. The phase lock loop contains circuits for maximum likelihood detection of the phase of the input signal. In the loop 14 the data bits are acquired and a voltage controlled oscillator, together with countdown circuits, provide a local bit rate clock which is synchronized to the incoming bit rate. A clock output is provided by the phase lock loop in the performance of its function as a bit rate timing generator which controls the bit detector 12.

In the bit detector 12, circuits, such as integrate and dump or filter and sample circuits, are used at the operator's discretion to determine the binary value of the input data during each bit interval. Timing of the operation of the bit detector circuits is under the control of the local clock generator in the phase lock loop. Each bit is thus detected and reconstructed into a noise free digital signal which may be provided as a serial pulse train at the data output. Before detailed discussion of the maximum likelihood phase lock loop consider that periodic signal, such as incoming PCM data, may be observed over an interval of time.

$$-K_1 t_0 \leq t < 0 \qquad (1)$$

An estimate of the bit value may be made during the observation. The estimate is made in such a way that the most likely value of the bit is chosen. The data signals have the general form $$s(t, \alpha, \tilde{a}) = \sqrt{S} \sum_{K=-\infty}^{\infty} a_k g(t-\alpha-kt_0) \quad (2)$$

where $t_0$ is the binary symbol period, is the synchronization parameter, $a_k$ is $\pm 1$ with equal probability, S is the amplitude of the signal, and $g(t)$ is a pulse with the properties $$\int_{-\infty}^{\infty} g^2(t)dt = 1 \quad (3)$$

and $$g(t) = \begin{cases} 0 & t<0 \\ 0 & t>1 \end{cases} \quad (4)$$

The periodic structure of such data signals is manifested by the fact that they are pulses which have periodic times of occurrence although the occurrence of the pulses themselves may be at random.

$$y(t) = s(t, \alpha, \tilde{a}) + n(t) \quad (5)$$

where $n(t)$ is a realization from a stationary gaussian noise ensemble with power density $N_0$.

Using the above assumptions, it can be shown for each weak signal conditions that the logarithm of the likelihood function is $$\ln \Lambda(y(t), \alpha) = \sum_{k=-K}^{0} \ln \cosh \left( \frac{\sqrt{S}}{N_0} \int_{\infty}^{\infty} y(t) g(t-\alpha-kt_0) dt \right) \quad (6)$$

In order to maximize $\ln \Lambda(y(t), \alpha)$ make the approximation.

$$\frac{\partial \ln \Lambda(y(t), \alpha)}{\partial \alpha} = \frac{\ln \Lambda(y(t), \alpha+\Delta/2) - \ln \Lambda(y(t), \alpha-\Delta/2)}{\Delta} \quad (7)$$

for small Δ where Δ represents a time displacement in the operation of the system. Setting this derivative equal to zero gives the equation $$0 = \ln \Lambda(y(t), \alpha+\Delta/2) - \ln \Lambda(y(t), \alpha-\Delta 2) \quad (8)$$

$$0 = \sum_{k=K}^{0} \ln \cosh \left[ \frac{\sqrt{S}}{N_0} \int_{\infty}^{\infty} y(t) g(t-\alpha-\Delta/2-kt_0) dt \right] - \sum_{k-K}^{0} \ln \cosh \left[ \frac{\sqrt{S}}{N_0} \int_{-\infty}^{\infty} y(t) g(t-\alpha+\Delta/2-kt_0) dt \right] \quad (9)$$

The error signal may be expressed by the following equation:

$$f(t) = \sum_{k=K}^{0} \ln \cosh \left[ \frac{\sqrt{S}}{N_0} \int_{-\infty}^{\infty} y(t) g(t-\alpha-\Delta/2-kt_0) dt \right] - \sum_{k=K}^{0} \ln \cosh \left[ \frac{\sqrt{S}}{N_0} \int_{-\infty}^{\infty} y(t) g(t-\alpha+\Delta/2-kt_0) dt \right] \quad (10)$$

Figure 2:
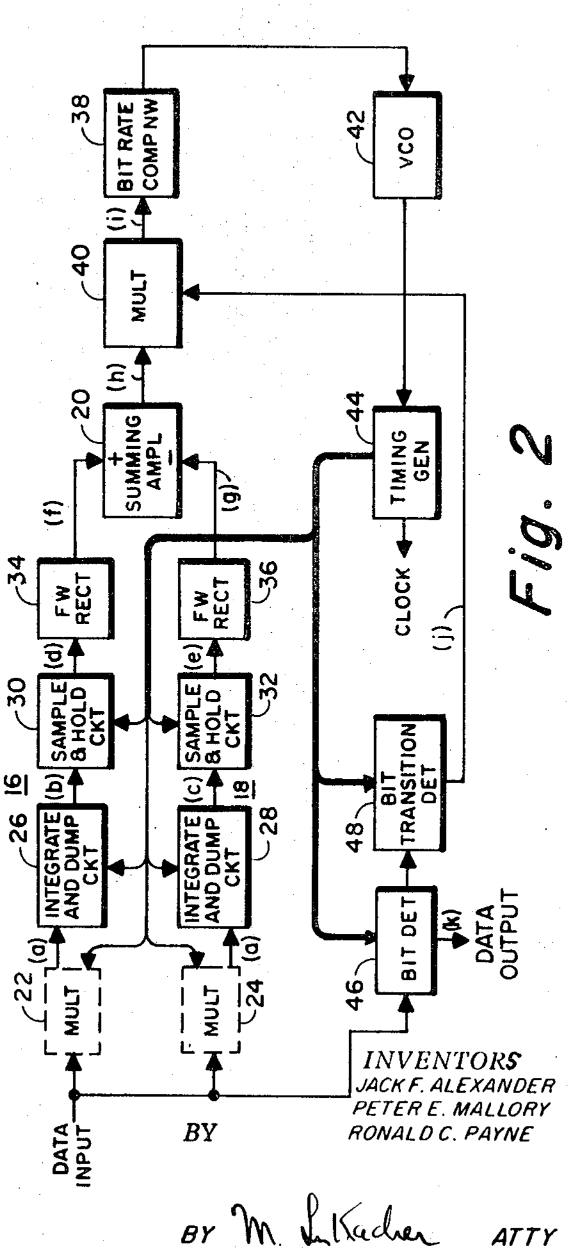
FIG. 2 is a more detailed block diagram of the system shown in FIG. 1.

FIG. 2 shows a system having a pair of channels 16 and 18, the outputs which are summed in a summing amplifier 20. The circuits in the channels 16 and 18 and the summing amplifier implement the error signal function set forth in equation (10). The integrals are generated by a pair of matched filters on each channel 16 and 18. The data input is provided after signal conditioning, as in conditioner 10, FIG. 1. The matched filters in each of the channels contain the multiplier circuits 22 and 24, the integrate and dump circuits 26 and 28 and the sample and hold circuits 30 and 32. The multiplier circuits are shown in dash lines to indicate that they may not be required in the event the that NRZ-type data is utilized. The 1*n* cosh component of the function is approximated by full wave rectifier circuits 34 and 36. The summation from $-k_1 t_o$ to 0 is approximated by the averaging action of the loop compensation networks such as bit rate compensation network 38. The advance and delay by $\frac{\Delta}{2}$ is controlled by timing of the operation of the matched filters. In the illustrated system, the look interval of the matched filters in the second channel 18 is delayed by a one-half bit interval with respect to the look interval from the matched filter in the first channel 16. The look interval can be varied to meet different signal conditions. The expected polarity of the output depends upon the estimate of a (viz, h the difference in phase between timing pulses from the clock and input date).

A multiplication circuit 40 which may for example be a gate operated upon the detection of the bit transition in the output data is connected between the summing amplifier 20 and the rate compensation network 38, in order to prevent the passage of output signals during the period when bits are not expected, thereby improving the signal-to-noise characteristics of the phase locked loop.

The loop also includes a voltage controlled oscillator 42 which may have a frequency which may be varied between 1.6 and 4.0 MHz., and which is controlled by the analogue signal voltage produced by the bit rate compensation network 38. The oscillator itself may be of the astable multivibrator type. The oscillator may operate in several, say the three, ranges, in order to accommodate different bit rate. The range may be controlled by generating a bias voltage which is applied directly to the voltage controlled oscillator control input to set the fundamental frequency of oscillation. A timing generator 44 at the output of the oscillator acts as the clock generator. It may contain decade counters or other count down logic so as to obtain the timing pulses. A local clock output may also be obtained from the timing generator 44. The data input and the clock is applied to a bit detector 46 which may include integrate and dump or filter and sample circuits which are operated by timing pulses from the generator to detect and regenerate the input data. A bit transition detector 48, which may be gating logic operated by the timing pulses, produces an output signal for use in the multiplier 40 which corresponds to a binary "1" when a bit transition is detected in the data input and a binary "0" when no bit transition is detected. As noted above, when the PCM data input is in the form of rectangular pulse, multipliers 22 and 24 may be eliminated. The matched filtering can be accomplished then entirely by means of the integrate and dump circuits 26 and 28. The timing of the integrate and dump operations is controlled by the timing generator 44 (viz. in effect by the estimated value of $\gamma$ which is represented by the phase of the clock output from the generator 44). The sample and hold circuits are, however, desirably included in order to more conveniently develop the levels for summing in the amplifier 20. As will be noted in connection with the discussion of FIG. 4, the sample and hold circuits may be located after the full wave rectifier circuits in their respective channels. The multiplier 22 is useful, however, in order to permit the phase lock loop to operate with various PCM code types. As noted when rectangular pulses such as NRZ data is applied to the loop, the multiplier may need only multiply the data by one. This, of course, means the data is not changed and the multiplier may be omitted. For split phase codes (viz, where the polarity changes and the transition occurs in the middle of each bit interval, the second one-half of the bit is always at complement of the first one-half), the multiplier should multiply the data hy oppositely polarized factors during each one-half of the look interval i.e. $\pm 1$ during the first one-half of the interval and $\mp 1$ during the remaining one-half). In this manner the operation of the loop will be independent of body type.

Figure 5:
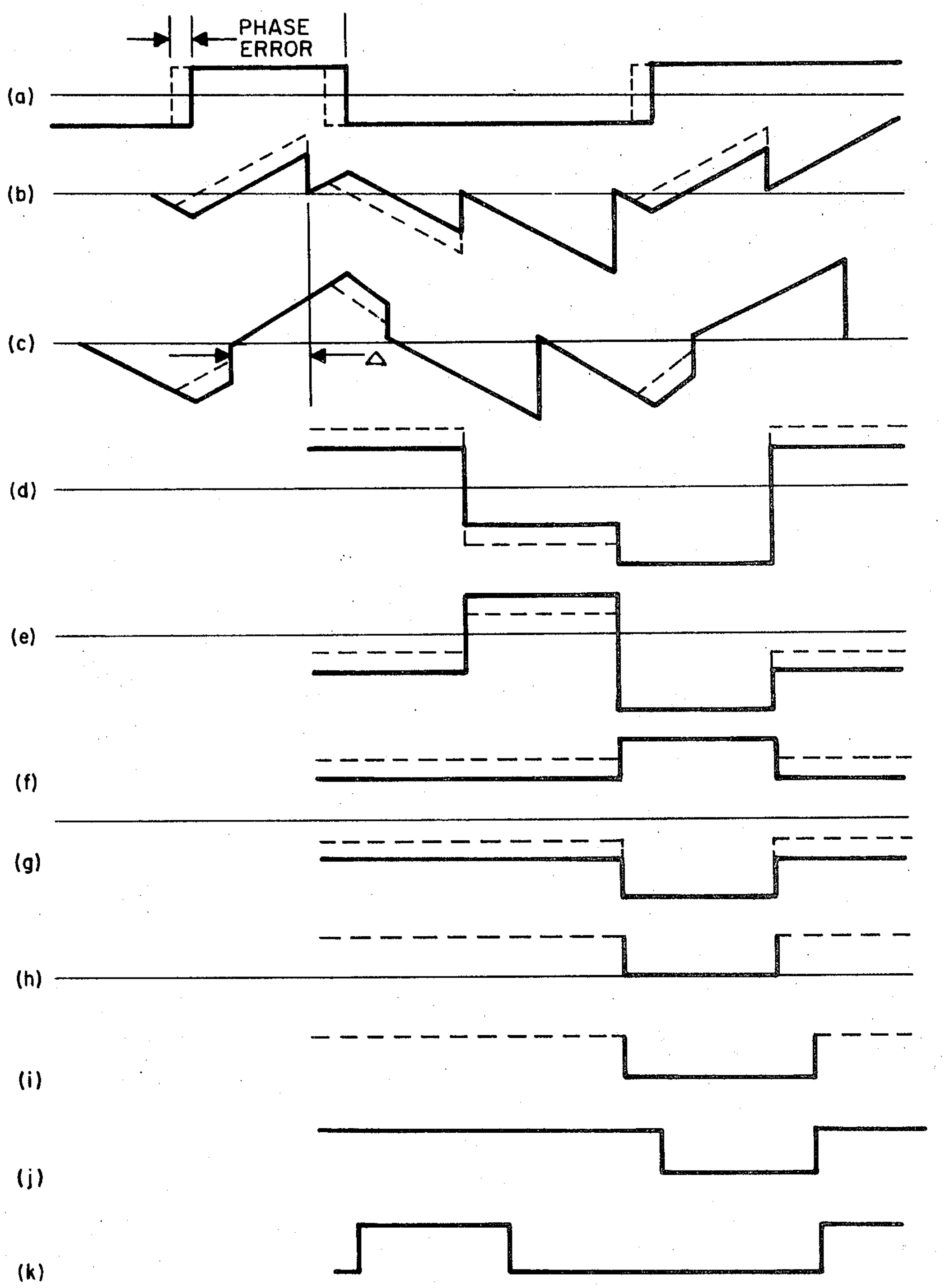
FIG. 5 is a series of waveforms produced in the system shown in FIG. 2.

The operation of the system shown in FIG. 2 will be more apparent from FIG. 5. The input to the loop is shown in wave form (*a*) as a pulse train of NRZ data. The pulses are idealized and the effect to to noise distortion is not shown to clarify the illustration. The dark line is for a data train which is perfectly in phase with the clock from the timing generator. The dotted line shows the data train which is advanced in phase with respect to the clock.

The integration period of the integrate and dump circuit 26 is displaced from the integration circuit and dump circuit 28 by one-half a bit period. Thus, when the loop has acquired the input data, the first integrate and dump circuit (viz, the first matched filter in channel 16) observes an interval one-fourth of a bit earlier than each incoming data bit while the second integrate and dump circuit (viz, the matched filter in the channel 18) observes an interval one-fourth after the beginning of each incoming data bit. It follows therefore that for an advance in phase of the data with respect to the clock the absolute value of the output from the integrate and dump circuit 26 as represented by wave form (*b*) increases in magnitude and the absolute value of the integrate and dump circuit 28 as represented in waveform *C*) decreases in magnitude. Of course, for a delay in phase of the incoming data with respect to the clock, the output of the integrate and dump circuit 26 would decrease while the output of integrate and dump circuit 28 will increase.

These outputs are shown in waveforms (*b*) and (*C*) as being bipolar. The full wave rectifiers 34 and 36 produces the absolute values of these outputs instead of the bipolar outputs. The waveforms (*f*) and (*g*) illustrate the positive and negative outputs obtained from the rectifiers 34 and 36 respectively. The waveforms (*d*) and (*e*) show the outputs of the sample and hold circuits. The samples are taken just prior to the time the signals integrated by the integrate and dump circuits are dumped (viz, before the capacitors in the circuits are discharged). The levels of course are bipolar and are rectified in full wave rectifiers 34 and 36. The diodes in these rectifiers are polarized to provide a positive output in the case of the rectifier 34 and the negative output in the case of the rectifier 36. These outputs are shown in waveforms (*f*) and (*g*).

The summing amplifier 20 output is the difference of the full wave rectifier 34 and 36 outputs. This output is shown in waveform (*h*), Again, the dark lines show that the output is zero when the clock is in phase with the input bit rate. The dotted line shows the input to the compensation networks 38 when the system is out of phase. The dark vertical line showing the transition is eliminated by the compensation networks 38. The output of the summing amplifier is therefore proportional to the displacement between the incoming data and the local timing generator 44 output.

The summing amplifier drives the compensation networks 38. These networks provide control of the loop gain and its frequency and phase response. Briefly, the loop compensation networks control the forward gain depending upon the dynamic range required to follow variations in the incoming data bit rate. Thus, the loop bandwidth is reduced for proper phase locking characteristics at low signal-to-noise ratios. The elements of the compensation network are adjusted in accordance with the incoming data bit rate, thereby providing optimum acquisition of the incoming data. A more detailed description of the compensation network will be discussed hereinafter in connection with FIG. 3.

The compensation network 38 drives the voltage control oscillator 42, the output of which is countdown in the timing generator 44 to produce the clock signals and the timing pulses for the other circuits of the system, as required. The bit detector 46 receives the data input after processing the input signal conditioner 10 (FIG. 1). When integrate and dump detection is used, the bit detectors may include dual integrate and dump circuits each operating during alternate bit intervals. While one circuit is integrating, the other is dumping in order to be ready to integrate during the next bit period. Timing pulses from the generator 44 control the integration and dump cycles. The integrated waveforms may be fed to trigger circuits having preset threshold such as Schmidt triggers which provide reconstructed or regenerated data to the output. The bit transition detector 48 may be a gate circuit which is opened by the clock pulse timed to occur at the beginning of each bit interval in the case of NRZ data. A detection of a transition as by means of a differentiating circuit is operative to produce a positive pulse representing a binary "1" while the absence of a transition is operative to produce a"0" when no bit transition is detected.

Figure 3:
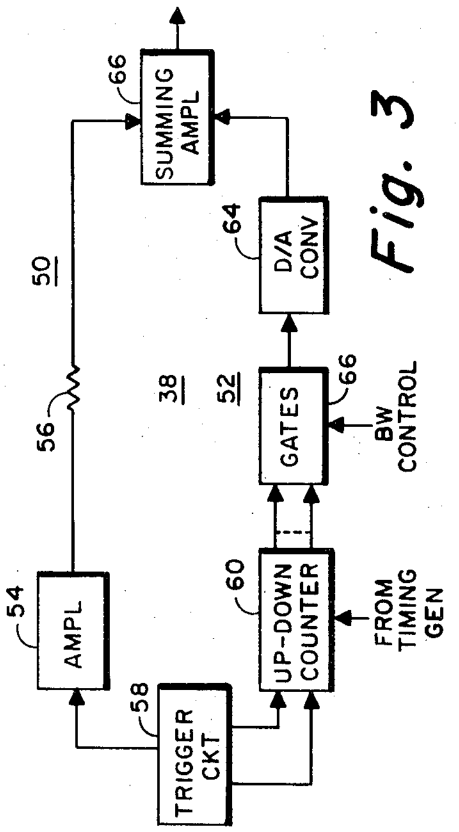
FIG. 3 is a block diagram of the loop compensation networks used in the system shown in FIG. 2.

While other compensation networks may be used, the compensation network 38 which is shown in greater detail in FIG. 3, is especially desirable. It includes two channels 50 and 51 both of which receive the summing amplifier output. The upper channel is a low level full bandwidth error signal transmission path for loop stabilization purposes. While the lower channel 51 is a digital low frequency filter. The upper channel 50 includes an amplifier, say an operational amplifier 54 and a resistor 56. It may be desirable to provide an additional channel paralleling the channel 50 with a large amplitude low pass characteristic to provide phase correction when operating under wide dynamic range, say in the order of 10 percent of the loop bandwidth in order to accurately and quickly acquire a rapid bit rate and track a jittering data signal.

The channel 52 includes a circuit 58 which generates a countdown and count up command to an up-down counter 60 depending upon whether the output of the summing amplifier 20 is above or below a certain threshold level. The counter 60 is strobed by pulses from the timing generator at the expected bit rate so that the count is changed at the bit rate and noise has less of a chance of causing an erroneous count. The binary value contained in the counter is converted into an output control voltage by a digital-to-analogue converter 64. In order to select the bandwidth under which the digital low frequency filter provided in the channel 52 may operate, the counter may be effectively lengthened to decrease the bandwidth of the filter and shortened to increase the bandwidth. If a narrow bandwidth is desired, all 12 stages may be gated to the digital-to-analogue converter 64. If narrower bandwidths are selected, the loop responds more slowly since more transitions are required to change the output of the converter 64. By lengthening the up-down counter at narrow bandwidths, the loop is made less sensitive to detected phase errors. Thus, narrower bandwidths are selected when processing noisy data.

The output of the digital analogue converter and the high frequency filter in the channel 50 is summed in a summing amplifier 66 to produce the analogue control voltage for the voltage controlled oscillator 42.

Figure 8:
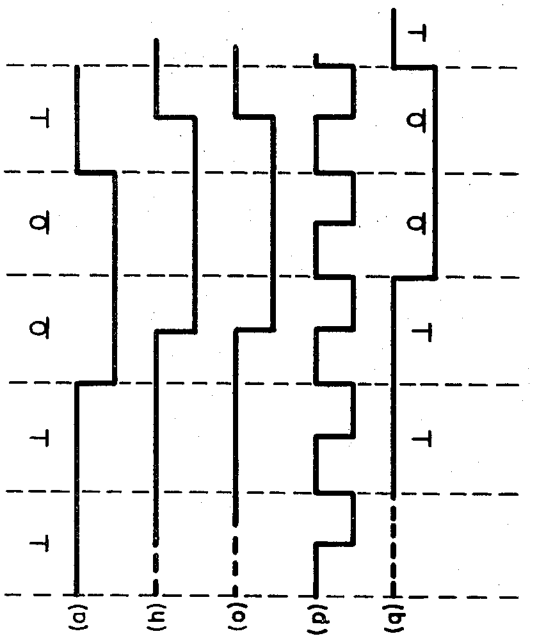
FIG. 8 is a series of waveforms which result from the operation of bit detection and reconstruction circuits shown in FIG. 4.
Figure 4:
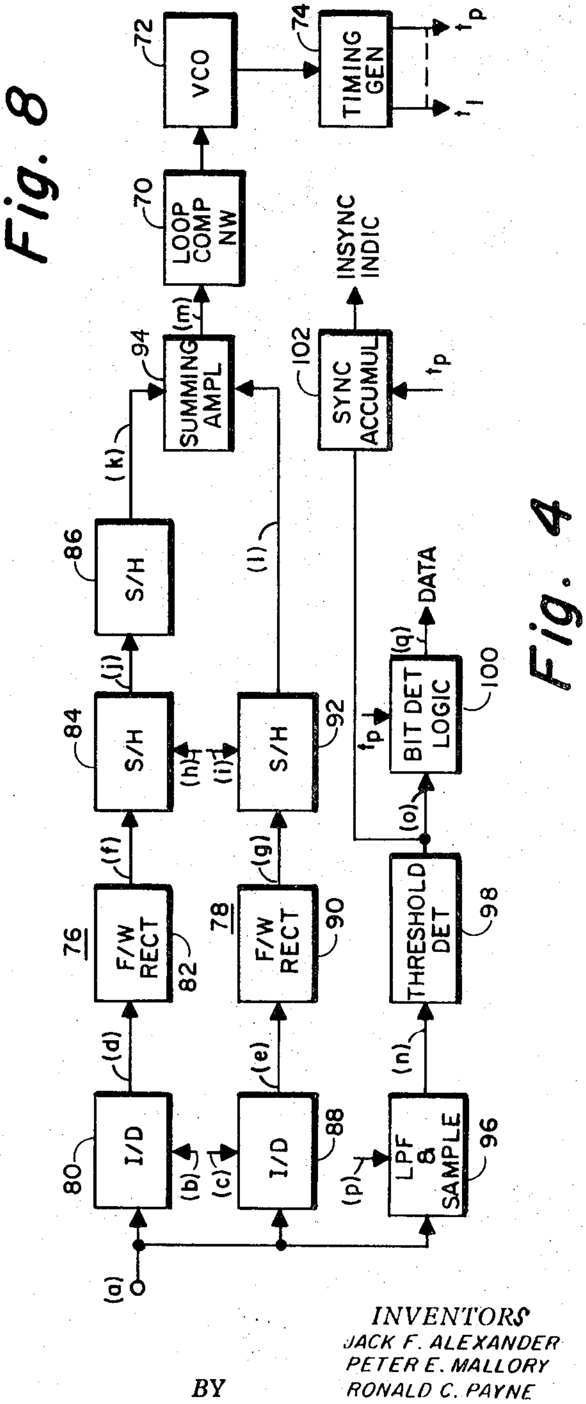
FIG. 4 is a block diagram of a synchronizing system in accordance with another embodiment of the invention.

Referring to FIG. 4, there is shown the maximum likelihood phase locked loop and bit detector circuits of a synchronized system in accordance with another embodiment of the invention. The operation of this system will be explained in connection with FIGS. 6, 7 and 8 which respectively show waveforms appearing in this system. The FIG. 6 waveforms represent conditions which exist when the data and the local clock are in phase. FIG. 7 illustrates the case where the input data leads the clock. FIG. 8 illustrates waveforms resulting from the operation of the filter and sample bit detector system. The data from the signal conditioner 10, FIG. 1, is applied to the input. These waveforms are shown at (*a*) in FIG. 6,7 and 8. It will be noted that the loop compensation network 70, voltage controlled oscillator 72 and the timing generator 74 are similar to their counterparts which are shown in FIG. 2. The timing generator produces a timing pulse indicated as $t_1$ through $t_p$. Of course, the generator also produces the local clock which is synchronized with the incoming bit rate. The phase lock loop includes two channels 76 and 78. The channel 76 has an integrate and dump circuit 80, a full wave rectifier 82 and a pair of sm sample and hold circuits 84 and 86. The other channel 78 has an integrate and dump circuit 88, a full wave rectifier 90 and a single sample and hold circuit 92. The channel outputs are applied to a summing amplifier 94 which drives the loop compensation network 70. Timing pulses are applied to the integrate and dump circuits and displaced from each other by one-fourth of a bit period, as shown on waveforms (*b*) and (*c*). Thus, the integrate circuits are allowed to integrate during the time when transitions in the data are expected to occur. The two integration periods are displaced from each other by one-fourth of a bit period. If the data and the timing pulse (viz, the clock) are in phase, the respective integrated voltages will be the same (see waveforms (*d*) and (*e*).

Figure 6:
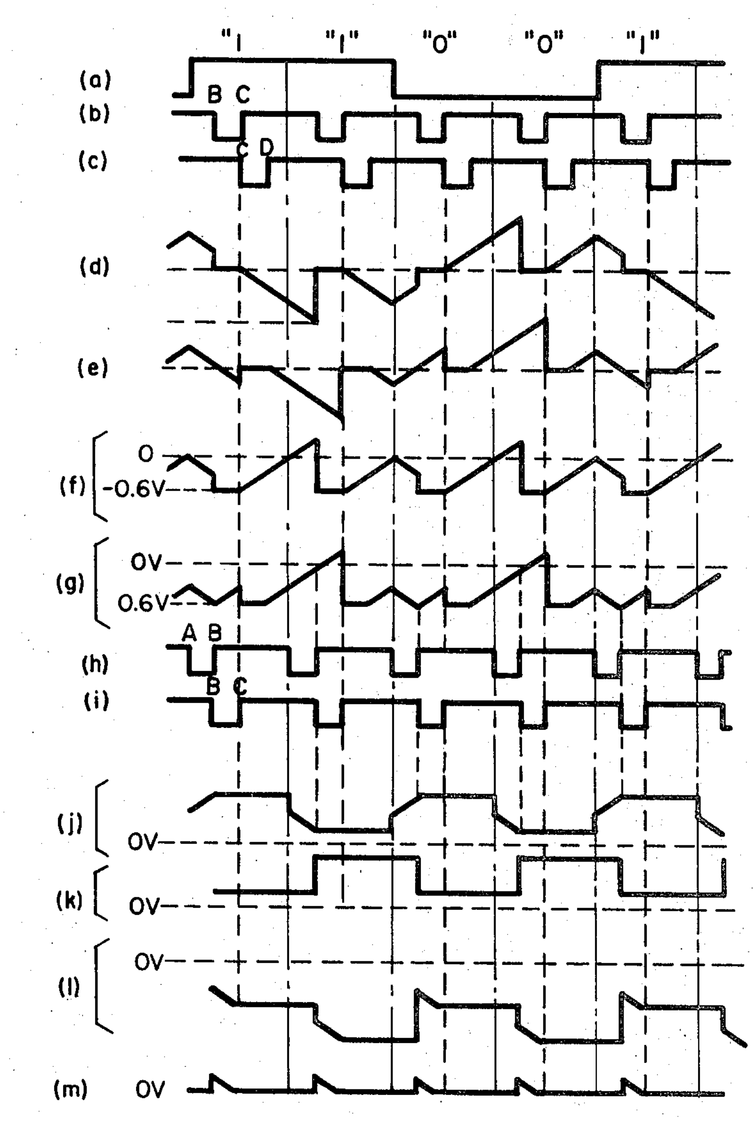
FIGS. 6 and 7 are waveforms produced in the operation of the system shown in FIG. 4.
Figure 7:
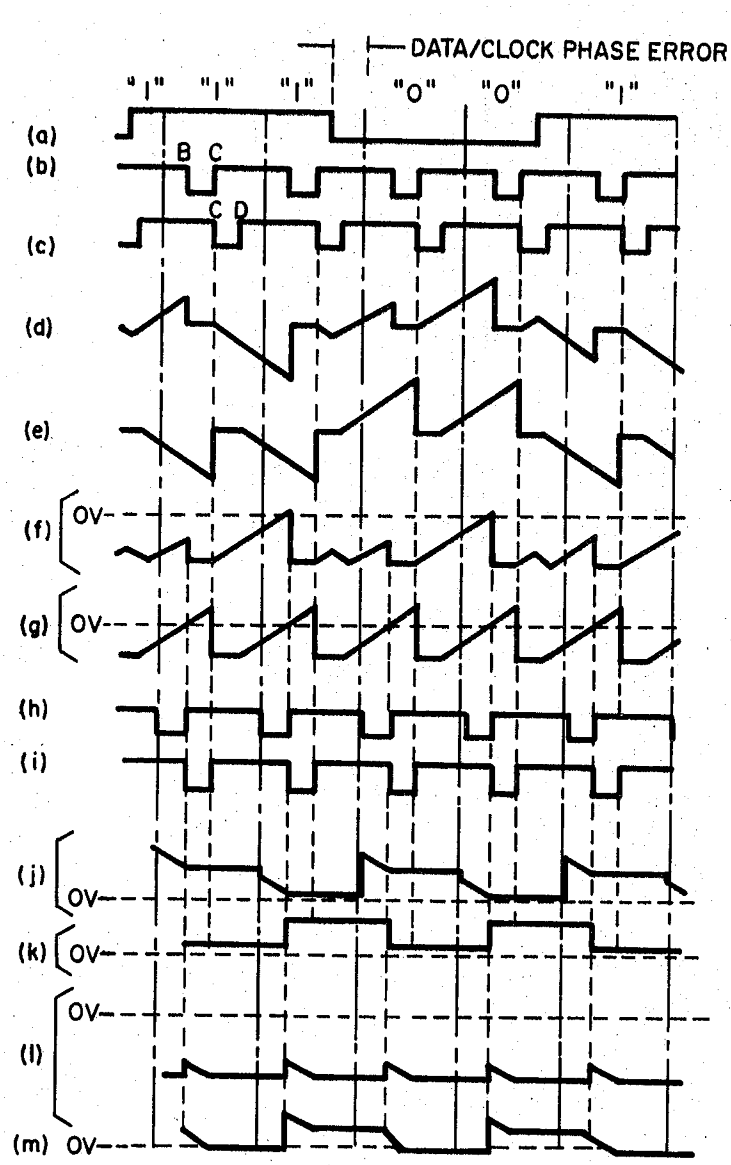

As shown in FIG. 6, the integrate and dump circuit 80 is dumped from clock time B and C and allowed to begin integration at clock time C. Similarly, the integrate and dump circuit 88 in the lower channel 78 begins integrating one-fourth of a bit time later at clock time D. Since the integrate and dump circuit outputs are bipolar, they are full wave rectified in the rectifier circuits 82 and 90 to produce the absolute values of the integrated signals. The waveforms (*f*) and(*g*) show the full wave rectifier outputs. They are displaced from ground due to the voltage drop across the full wave rectifier diodes. After full wave rectification, timing pulses shown in waveforms (*h*) and (*i*) are used to strobe the sample and hold circuits 84 and 92 at the end of the respective integration periods. The sample voltage in the upper channel 76 is obtained in two steps. The first sampler 84 samples the output of the full wave rectifier 82. The sample voltage is then transferred by the sample and hold circuit 86 in the same time period that the sample is taken by the hold circuit 92 in the lower channel 78. Thus, although the output of the first sample and hollow circuit 84 shown in waveform (*j*) is shifted to the location shown in waveform (*k*) it is aligned with the output of the sample and hold circuit 92 which is shown in waveform (*L*). The summing amplifier 94 then derives the error voltage. As shown in waveform (*m*), FIG. 7, the sum of the two samples is a positive voltage when the clock lags the data. If the data lags the clock, the sum of the two samples is a negative voltage, The loop compensation network, including the threshold responsive trigger circuit, ignores the low amplitude pulses resulting from the slight difference between the samples. Thus, the error voltage when the clock and data are in phase will be effectively a zero voltage level, as shown in FIG. 6. The oscillator 92 then continues to operate at its fundamental frequency.

As described in connection with FIG. 3, the compensation network 70 may include a counter the output of which is translated into an analogue voltage for controlling the VCO 72. It may be desirable to provide a restoring force counter which drives the up-down counter in the compensation network 70 towards a center scale (viz, to count one count towards a count corresponding to a 0-volt output level every predetermined number of transitions, 16 transitions being a suitable number). Thus, the up-down counter will tend to remain at the center of its dynamic range even under conditions of noisy data or when the phase lock loop is out of sync.

The bit detector includes a low pass filter and sample circuit 96. Of course, integrate and dump detection, as mentioned above, may alternately be used. The low pass filter in the circuit 96 is tuned in accordance with the expected bit rate to cut off at one-half the incoming bit rate. The roll off characteristic of the filter may suitably be 18db per octave with the 3db point at one-half the bit rate. Since this filter interposes a 180° phase shaft, as shown in waveform (*n*) of FIG. 8, the clock pulse which samples the data is shifted by 180° from the expected bit rate. (See waveform (*p*)). Therefore, the data is sampled at its maximum signal energy point. The threshold detector circuit 98 may be a Schmidt trigger which is adjusted to a threshold, say of 0-volts. Thus, the output is sampled once each bit period and its level is established. Bit detector logic 100, which may include gates and level setting (saturating) amplifiers operated by timing pulses, produce the regenerated data stream indicated at waveform (*g*), FIG. 8.

A sync accumulator circuit 102 serves the function of determining if the signal is in synchronism. When the NRZ data is properly synchronized, it will be in predetermined phase relationship with the clock pulses indicated at $t_p$. Thus, the accumulator 102 includes gating logic for comparing the beginning of the bit periods (viz, the transition) of the data with clock pulses delayed by one-fourth bit period increments and reads out the transitions into an up-down counter which accumulates the count. An in-sync condition is indicated when a certain number of counts, say 16, is stored in the up-down counter. This count may be displayed on lamps connected to the counter.

From the foregoing description, it will be apparent that improved bit synchronization systems have been described wi which are especially suitable for synchronizing and reconstructing data in the presence of noise and distortion. While exemplary embodiments and systems incorporating the invention have never been described, it will be appreciated that variations and modifications thereof will become apparent to those skills skills skilled in the art. Accordingly, the foregoing description should be taken as illustrative and not in a limiting sense.

We claim:

1. A synchronization system for product output signals synchronous with an input signal, said system comprising:

a. a signal controlled oscillator:

b. means responsive to said input signal and signals from said oscillator for providing the control signal for said oscillator which satisfies the following equation $$f(t) = \sum_{k=-K}^{0} \ln \text{cash} \left[ \frac{\sqrt{S}}{N_o} \int_{-\infty}^{\infty} y(t) g\left(t-\gamma-\frac{\Delta}{2}-kt_o\right) dt \right] - \sum_{k=K}^{0} \ln \text{cash} \left[ \frac{\sqrt{S}}{N_o} \int_{-\infty}^{\infty} y(t) g\left(t-\gamma+\frac{\Delta}{2}-kt_o\right) dt \right]$$

where $f(t)$ is said control signal, S is the amplitude of the input signal, $y(t)$ is a function which represents the input signal $g(t)$ is a function which represents a pulse obtained from the oscillator $\gamma$ is the synchronization parameter, and $\Delta$ is a time delay; and c. means for applying said control sing signal to said oscillator for controlling the frequency and phase thereof, thereby providing said output signals synchronous with said input signals.

2. The invention as set forth in claim 1 wherein said input signals are data signals and wherein said system includes means responsive to said output signals for detecting and reconstructing said input data signals.

3. The invention asset forth in claim 1 wherein said oscillator and said control signal providing means are included in a phase locked loop, said loop also including compensation means responsive to the rate of said control signal for varying the bandwidth characteristic of said loop.

4. The invention as set forth in claim 1 including input signal conditioning means for controlling the gain and average value of said periodic signal prior to application to said control signal responsive means.

5. A synchronization system comprising:

a. a phase locked loop including;

1. an error signal controlled oscillator for providing timing pulses of variable phase and rate,
2. a matched filter including an integrate and dump circuit cooperated by said timing pulses, and
3. a bit rate compensation network responsive to signals from said matched filter for providing said error signal, b. means for applying input signals to said loop;

c. means in at least one of said loop and signal applying means for translating said input signals into unipolar form; and d. said timing pulses being synchronous with said input signals.

6. The invention as set forth in claim 5 wherein said periodic input signals are pulses representing bits of binary data, and including bit detector means for sampling said pulses upon occurrence of said timing pulses for producing output data pulses synchronous with said timing pulses.

7. A synchronization system for periodic input signals comprising a:

phase locked loop having a pair of channels to which said signals are simultaneously applied;

said channels each including a matched filter and a full wave rectifier;

means for applying control pulses to strobe the matched filters in each of said channels at different times;

means for producing an output corresponding to the difference in the outputs from each of said channels to provide an error signal; and a variable oscillator controlled by said error signal to produce clock signals synchronous with said input signal, said oscillator also providing a signal to said control pulse applying means.

8.
The invention as set forth in claim 7 wherein said periodic input signals are pulses representing a series of data bits and wherein said system includes a bit detector for receiving said input signals and said clock signals and reconstructing a series of output bits synchronous with said clock signals.

9. The invention as set forth in claim 7 wherein said matched filters in each of said channels includes an integrate and dump circuit and said oscillator has connected to its output a timing generator for providing said s control pulses to said integrate and dump circuits in each of said channels which are displaced about one-half period of said periodic input signal.

10. The invention as set forth in claim 9 wherein said channels each include a multiplier circuit having inputs from said timing generator.

11. The invention as set forth in claim 9 wherein each of said channels includes a sample and hold circuit responsive to timing pulses from said timing generator.

12. The invention as set forth in claim 11 wherein said phase locked loop includes a loop compensating network connected between said channel difference output providing means and said oscillator, said networks including a pair of channels, one being a transmission path for such output and the other containing a digital low pass filter, means for combining said network channel outputs for producing the error signal for said oscillator.

13. The invention as set forth in claim 12 wherein said digital low pass filter includes:

a. a trigger circuit for producing first and second pulses indicating when the input to said filter is above or below a certain threshold level respectively;

an up-down counter which is incremental by said first pulses and decremented by said second pulses;

c. means for varying the length of the count of said counter; and d. digital-to-analogue converting means responsive to said count for producing said digital low pass filter channel output.